United States Patent
Lou et al.

(10) Patent No.: US 9,685,172 B2
(45) Date of Patent: Jun. 20, 2017

(54) METHOD AND DEVICE FOR SUPPRESSING RESIDUAL ECHOES BASED ON INVERSE TRANSMITTER RECEIVER DISTANCE AND DELAY FOR SPEECH SIGNALS DIRECTLY INCIDENT ON A TRANSMITTER ARRAY

(75) Inventors: Shasha Lou, Weifang (CN); Bo Li, Weifang (CN); Song Liu, Weifang (CN)

(73) Assignee: GOERTEK INC, Weifang (CN)

( * ) Notice: Subject to any disclaimer, the term of this patent is extended or adjusted under 35 U.S.C. 154(b) by 803 days.

(21) Appl. No.: 13/642,661

(22) PCT Filed: Oct. 24, 2011

(86) PCT No.: PCT/CN2011/081180
§ 371 (c)(1),
(2), (4) Date: Jan. 30, 2013

(87) PCT Pub. No.: WO2013/007070
PCT Pub. Date: Jan. 17, 2013

(65) Prior Publication Data
US 2013/0151247 A1  Jun. 13, 2013

(51) Int. Cl.
*H04M 9/08* (2006.01)
*G10L 15/00* (2013.01)
(Continued)

(52) U.S. Cl.
CPC ......... *G10L 21/0216* (2013.01); *H04M 9/082* (2013.01); *G10L 15/20* (2013.01);
(Continued)

(58) Field of Classification Search
CPC .. G10L 21/0216; G10L 15/20; G10L 21/0208
(Continued)

(56) References Cited

U.S. PATENT DOCUMENTS

| 7,478,041 B2 * | 1/2009 | Ichikawa ............ G10L 21/0216 379/406.08 |
| 2004/0071284 A1 * | 4/2004 | Abutalebi ........... G10L 21/0208 379/406.08 |

(Continued)

*Primary Examiner* — Farzad Kazeminezhad
(74) *Attorney, Agent, or Firm* — Troutman Sanders

(57) ABSTRACT

The present invention discloses a method and a device for suppressing residual echoes. The method comprises: performing adaptive filtering on M transmitter signals respectively to obtain M adaptive filtered signals; performing array-filtering 5 on the M−1 adaptive filtered signals other than the first adaptive filtered signal to obtain M−1 array-filter output signals by considering relative positions of the receiver and each of the transmitters and the time delay attributed to distances between the transmitters and the receiver; subtracting each of the M−1 array-filter output signals from the first adaptive filtered signal respectively to obtain M−1 difference signals, performing time-domain/frequency-domain conversion on the M−1 difference signals respectively and selecting one of the frequency-domain signals that has the least energy; performing time-domain/frequency-domain conversion on the first adaptive filtered signal and the $M^{th}$ adaptive filtered signal and then performing speech probability filtering on the converted first adaptive filtered signal and the converted $M^{th}$ adaptive filtered signal to obtain one frequency-domain speech probability signal; and multiplying the frequency-domain speech probability signal with the selected signal that has the least energy, and performing frequency-domain/time-domain conversion on the multiplication result to obtain a signal as a transmitter output signal. The technical solutions of the present invention can suppress the residual echoes effectively without impairing near end speech.

6 Claims, 9 Drawing Sheets

(51) Int. Cl.
*G10L 21/0216* (2013.01)
*G10L 15/20* (2006.01)
*H04R 3/00* (2006.01)
*G10L 21/0208* (2013.01)

(52) U.S. Cl.
CPC .... *G10L 2021/02082* (2013.01); *H04R 3/005* (2013.01); *H04R 2201/109* (2013.01); *H04R 2499/13* (2013.01)

(58) Field of Classification Search
USPC .............................. 379/406.08; 704/226, 234
See application file for complete search history.

(56) References Cited

U.S. PATENT DOCUMENTS

2005/0240401 A1* 10/2005 Ebenezer ............ G10L 21/0208
704/226
2009/0018828 A1* 1/2009 Nakadai .................. G10L 15/20
704/234

\* cited by examiner

S1110 Performing adaptive echo filtering on transmitter array signals by use of the receiver signal to obtain an echo filtered signal array S1120 Filtering residual echoes in the obtained echo filtered signal array by use of the received receiver signal

METHOD AND DEVICE FOR SUPPRESSING RESIDUAL ECHOES BASED ON INVERSE TRANSMITTER RECEIVER DISTANCE AND DELAY FOR SPEECH SIGNALS DIRECTLY INCIDENT ON A TRANSMITTER ARRAY

TECHNICAL FIELD

The present invention relates to the fields of echo eliminating technologies, and more particularly, to a method and a device for suppressing residual echoes.

DESCRIPTION OF RELATED ART

In speech communication, a signal from a receiver (also called SPK, EAR or EARPHONE) is mixed into a receiving signal of a transmitter (also called microphone, mike or pickup) through line reflection and acoustic reflection, and is fed to a far end so that an echo can be heard at the far end. The echo will significantly interfere with the both communication parties, affect the communication quality, and under severe situation even cause a howling, which not only makes it completely impossible to communicate but also may impair the communication apparatuses. Therefore, in order to ensure the communication quality and the safety of the apparatuses, usually the echo must be suppressed in the speech communication.

An echo signal is generated from a receiver signal which is electro-acoustically converted into an actual sound signal, played, and then subject to an environmental reflection. Both electro-acoustic conversion and environmental reflection of the receiver can be viewed as a filtering process, so the echo signal can be viewed as a sound signal generated by a receiver signal through a particular filter.

Simple echo suppressing is to change a channel into a half-duplex mode, under which only a unidirectional signal is transmitted in the channel at any time point so as to suppress echoes. However, in case of double talks at the far end and the near end, the sound at the near end cannot be heard at the far end where a person is talking, so interference is caused to fluency of the communication.

As the requirements on the speech communication become increasingly higher, the adaptive echo eliminating technology is usually adopted to suppress echoes and also protect speech at the near end, so as to ensure the duplex performance.

The adaptive echo eliminating technology uses an adaptive filter as an echo path eliminating filter to eliminate echoes. The filter automatically tracks variations of the echo reflection environment in real time by comparing a receiver signal with a transmitter signal, so as to obtain an accurate echo path to eliminate the echoes. Conventionally, this can eliminate most of the echoes without affecting the duplex performance. However, in practical systems, because the receiver itself has distortion, the conventional adaptive echo eliminating technology cannot eliminate all the echoes but leaves behind some residual echoes.

The existing technologies for suppressing or eliminating residual echoes mainly include two methods. One of the methods is to monitor the intensity of the residual echoes and limit the power of the receiver, so that the residual echoes are lower than a limited level. However, this method will cause a large fluctuation in intensity of the receiver signal, affecting the auditory impression of the user at the near end. The other of the methods is to change a channel into a half-duplex mode when the residual echoes have a large intensity. Obviously, this method will impair the speech at the near end when suppressing residual echoes. Particularly for some portable small hands-free communication apparatuses, because the receiver has large distortion, and the structure is compact and thus the transmitter and the receiver has a small distance therebetween, the channel will be changed into the half-duplex mode to suppress the residual echoes when the residual echoes have a large intensity, which affects fluency of the communication.

BRIEF SUMMARY OF THE INVENTION

In view of the aforesaid problems, the present invention, by combining array processing with echo suppressing and making full use of an acoustic structure of a small hands-free communication apparatus, provides a method and a device for suppressing residual echoes, which can mitigate the impair to speech at the near end when reducing the residual echoes and thus improve the duplex performance.

The present invention discloses a method for suppressing residual echoes. The method is suitable for use in a communication apparatus comprising M transmitters and one receiver, wherein M is a natural number greater than 1, and the M transmitters are arranged in line to form an array. The method comprises:

performing adaptive filtering on M transmitter signals respectively with a receiver signal to obtain M adaptive filtered signals;

processing the M−1 adaptive filtered signals except the first adaptive filtered signal by respective array-filters to obtain M−1 array-filter output signals, wherein for each of the M−1 adaptive filtered signals, weight of the array-filters that corresponds to the adaptive filtered signal is determined according to a relative positions between the receiver and the transmitter that corresponds to the adaptive filtered signal;

subtracting each of the M−1 array-filter output signals from the first adaptive filtered signal respectively to obtain M−1 difference signals, performing time-domain/frequency-domain conversion on the M−1 difference signals respectively and selecting one of the frequency-domain signals that has the least energy;

performing time-domain/frequency-domain conversion on the first adaptive filtered signal and the $M^{th}$ adaptive filtered signal and then performing speech probability filtering on the converted first adaptive filtered signal and the converted $M^{th}$ adaptive filtered signal to obtain one frequency-domain speech probability signal; and multiplying the frequency-domain speech probability signal with the selected frequency-domain signal that has the least energy, and performing frequency-domain/time-domain conversion on the multiplication result to obtain a signal as a speech output signal in which the residual echoes have been suppressed.

Preferably, the method further comprises a following step after the step of multiplying the frequency-domain speech probability signal with the selected frequency-domain signal that has the least energy:

performing spectrum filtering on the multiplication result with the receiver signal that has been time-domain/frequency-domain converted, subtracting the spectrum filtering result from the multiplication result, and performing frequency-domain/time-domain conversion on the subtraction result to obtain a signal as the speech output signal in which the residual echoes have been suppressed.

Preferably, the step of, for each of the adaptive filtered signals, determining weights of the one of the array-filters that corresponds to the adaptive filtered signal according to relative positions between the receiver and the first transmitter and the one of the transmitters that corresponds to the adaptive filtering signal comprises:

for each of current adaptive filtered signals among the M−1 adaptive filtered signals except the first adaptive filtered signal, weights of the respective array-filter are determined according to the following formulas:

$$\frac{\partial E[(e_1 - e_2 * h)^2]}{\partial h} = 0,$$

$$e_1 = \frac{D_2}{D_1} e_2 \left( t + \frac{D_2}{c} + \frac{D_1}{c} \right)$$

where E represents the averaging operation, h represents the array-filter, e1 represents the first adaptive filtered signal, e2 represents the current adaptive filtered signal, D1 represents a distance between the receiver and the first transmitter, D2 represents a distance between the receiver and one of the transmitters that corresponds to the current adaptive filtered signal, and c represents the acoustic speed, t represents the current time.

Preferably, the step of performing time-domain/frequency-domain conversion on the first adaptive filtered signal and the $M^{th}$ adaptive filtered signal and then performing speech probability filtering on a converted first adaptive filtered signal and a converted $M^{th}$ adaptive filtered signal to obtain one frequency-domain speech probability signal comprises:

calculating an arriving angle α(f) of a sound signal arriving at the transmitter array at each frequency point according to the two results of performing time-domain/frequency-domain conversion on the first adaptive filtered signal and the $M^{th}$ adaptive filtered signal; and then calculating the speech probability pF(f) according to the following formula:

$$pF(f)=1-\alpha(f)/90;$$

where pF(f) is the frequency-domain speech probability signal obtained.

Preferably, the step of performing spectrum filtering on the multiplication result a receiver signal that has been time-domain/frequency-domain converted comprises:

dividing the full frequency range into N subbands having boundaries $B_1 \sim B_{N+1}$, and performing the following calculations in each of the N subbands:

calculating a matching function $H_M(f)$:

$$H_M(f) = \frac{\sum_{f=B_i}^{f=B_{i+1}} Em_2^2(f)}{\sum_{f=B_i}^{f=B_{i+1}} X^2(f)}$$

where i is a serial number of each of the subbands, $Em_2(f)$ is the multiplication result, and X(f) is a result obtained from the time-domain/frequency-domain conversion on the receiver signal;

calculating a matched echo $Y_M(f)$: $Y_M(f)=X(f)H_M(F)$;

multiplying the matched echo $Y_M(f)$ with a factor Ag to obtain a spectrum filtering result; and then subtracting the spectrum filtering result from the multiplication result is represented as:

$$Em_2(f) \cdot \left( 1 - Ag \frac{|Y_M(f)|}{|Em_2(f)|} \right).$$

The present invention further discloses a device for suppressing residual echoes. The device is suitable for use in a communication apparatus comprising M transmitters and one receiver, wherein M is a natural number greater than 1, and the M transmitters are arranged in line to form an array. The device comprises: M adaptive filter components, M−1 array-filter components, one comparison selector, one speech probability estimation component, one multiplier and one time-domain/frequency-domain converter, wherein the M adaptive filter components are configured to perform adaptive filtering on M transmitter signals respectively with a receiver signal to output M adaptive filtered signals;

the M−1 array-filter components correspond to the M−1 adaptive filtered signals except the first adaptive filtered signal in one-to-one correspondence, and each of the array-filter components comprises one array-filter, one subtractor, and one time-domain/frequency-domain converter, wherein the array-filter is configured to perform array-filtering on the corresponding adaptive filtered signal to obtain a signal and then to output the obtained signal to the subtractor, the subtractor is configured to subtract the signal outputted by the array-filter from the first adaptive filtered signal to obtain a signal and then to output the obtained signal to the time-domain/frequency-domain converter, and the time-domain/frequency-domain converter is configured to perform time-domain/frequency-domain conversion on the received signal to obtain a frequency-domain signal and then to output the obtained frequency-domain signal to the comparison selector;

the comparison selector is configured to receive the M−1 frequency-domain signals outputted by the M−1 array-filter components and select one of the frequency-domain signals that has the least energy and then output the selected one signal to the multiplier;

the speech probability estimation component comprises two time-domain/frequency-domain converters and one speech probability estimator, wherein the two time-domain/frequency-domain converters are configured to perform time-domain/frequency-domain conversion on the first adaptive filtered signal and the $M^{th}$ adaptive filtered signal respectively to obtain signals, and to output the obtained signals to the speech probability estimator, and the speech probability estimator is configured to perform speech probability filtering according to the two signals received so as to output one frequency-domain speech probability signal to the multiplier;

the multiplier is configured to multiply the two frequency-domain signals received to obtain a signal, and to output the obtained signal to the frequency-time/time-domain converter; and the frequency-domain/time-domain converter is configured to perform frequency-domain/time-domain conversion on the received signal to obtain a signal as a speech output signal in which the residual echoes have been suppressed.

Preferably, the device further comprises one spectrum filtering component between the multiplier and the frequency-domain/time-domain converter, the spectrum filtering component comprises one time-domain/frequency-domain converter, one spectrum filter and one subtractor, wherein the time-domain/frequency-domain converter is configured to perform time-domain/frequency-domain conversion on the receiver signal to obtain a signal and to output the obtained signal to the spectrum filter, the spectrum filter is configured to perform spectrum filtering on the signal outputted by the multiplier and the signal outputted by the time-domain/frequency-domain converter to obtain a signal and then to output the obtained signal to the subtractor, and the subtractor is configured to subtract the signal outputted by the spectrum filter from the signal outputted by the multiplier to obtain a signal and then to output the obtained signal to the frequency-domain/time-domain converter.

Preferably, in the device weights of each of the array-filters are determined according to the following formulas:

$$\frac{\partial E[(e_1 - e_2 * h)^2]}{\partial h} = 0,$$

$$e_1 = \frac{D_2}{D_1} e_2 \left( t + \frac{D_2}{c} + \frac{D_1}{c} \right)$$

where h represents the array-filter, $e_1$ represents the first adaptive filtered signal, $e_2$ represents the adaptive filtered signal corresponding to the array-filter, $D_1$ represents a distance between the receiver and the first transmitter, $D_2$ represents a distance between the receiver and the one of the transmitters that corresponds to the array-filter, and c represents the acoustic speed.

Preferably, in the device the speech probability estimator is configured to calculate an arriving angle α(f) of a sound signal arriving at the transmitter array at each frequency point according to the two signals received, then calculate the speech probability pF(f) according to the following formula: pF(f)=1−α(f)/90, and output pF(f) to the subtractor as the frequency-domain speech probability signal.

Preferably, in the device the spectrum filter is configured to divide the full frequency range into N subbands having boundaries $B_1$~$B_{N+1}$, and perform the following calculations in each of the N subbands:

calculating a matching function $H_M(f)$:

$$H_M(f) = \frac{\sum_{f=B_i}^{f=B_{i+1}} Em_2^2(f)}{\sum_{f=B_i}^{f=B_{i+1}} X^2(f)}$$

where i is a serial number of each of the subbands, $Em_2(f)$ is an output signal of the multiplier, and X(f) is an output signal of the time-domain/frequency-domain converter;

calculating a matched echo $Y_M(f)$: $Y_M(f)=X(f)H_M(F)$; and multiplying the matched echo $Y_M(f)$ with a factor Ag to obtain a spectrum filtering result and then to output the obtained result to the subtractor.

By using new echo eliminating technologies to combine the residual echo filtering design with array space filtering, and making full use of the acoustic characteristics of a small hands-free communication apparatus and positional information of the transmitters and the receiver, the method and the device for suppressing residual echoes according to the present invention can extract speech probability information according to differences in time and in phase between the echoes and the speech at the near end upon arriving at the transmitters, and then discriminate between a speech region and an echo region. In this way, the residual echoes can be filtered out effectively, and the speech at the near end is protected.

To achieve the aforesaid and related objectives, one or more aspects of the present invention comprise features that will be detailed in the following description and specified in the appended claims. The following description and the attached drawings describe some illustrative aspects of the present invention in detail. However, these aspects only illustrate some of the implementations that can use the principle of the present invention. Furthermore, the present invention is intended to cover all of these aspects and equivalents thereof.

BRIEF DESCRIPTION OF THE SEVERAL VIEWS OF THE DRAWINGS

Other objectives and results of the present invention will become more apparent and easier to be understood by referring to the description in conjunction with the attached drawings as well as the claims and by fully understanding the present invention. In the attached drawings:

In all the attached drawings, identical reference numbers denote similar or corresponding features or functions.

DETAILED DESCRIPTION OF THE INVENTION

Hereinbelow, embodiments of the present invention will be described in detail with reference to the attached drawings.

Figure 1:
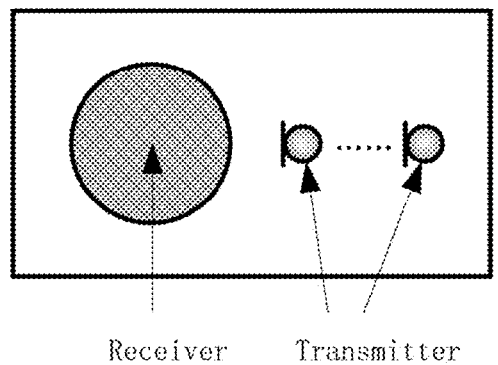
FIG. 1 is a schematic view illustrating an embodiment of relative positions of a receiver and a transmitter array used in the present invention.
Figure 2:
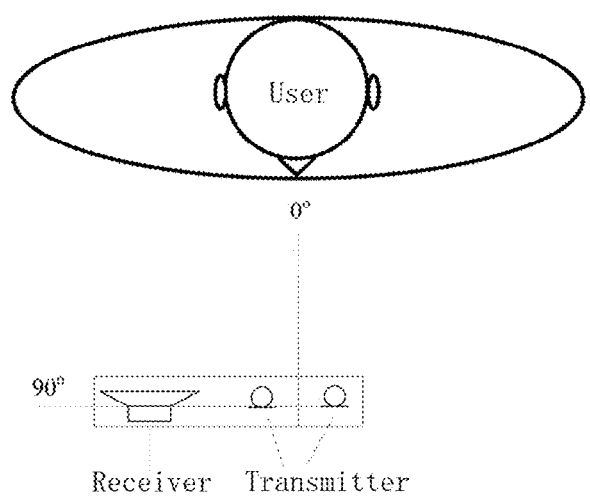
FIG. 2 is a schematic view illustrating an embodiment of a usage scenario of a small hands-free communication apparatus used in the present invention.

The present invention uses a transmitter array to eliminate residual echoes and is thus suitable for use in a small hands-free communication apparatus comprising a plurality of transmitters and a single receiver. FIG. 1 and FIG. 2 are schematic views illustrating embodiments of relative positions of a receiver and a transmitter array and a usage scenario of a small hands-free communication apparatus that are used in the present invention, respectively. As shown in FIG. 1 and FIG. 2, in this communication apparatus, the receiver is generally placed in a 90° direction with respect to the transmitter array, and the user is in a 0° direction with respect to the transmitter array. This conforms to some application scenarios such as an on-board hands-free carkit where the user faces the transmitter array and the position is relatively fixed. FIG. 1 and FIG. 2 illustrate examples of dual transmitters, and a more-than-two-transmitter array is disposed in a similar way.

From the viewpoint of a user, the distance from the user to each of the transmitters is almost equal; that is, each transmitter in the transmitter array receives a substantially identical speech signal sent from the user. From the viewpoint of a receiver, however, the distance from the receiver to each of the transmitters is unequal. Taking a dual-transmitter array as an example, the distance from the receiver to the transmitter 1 is $D_1$, the distance from the receiver to the transmitter 2 is $D_2$, and $D_1 \geq 2D_2$ (e.g., $D_1=9$ cm, $D_2=4$ cm). There is a phase difference between echoes that are sent by the receiver to the two transmitters while the speeches sent by the user to the two transmitters are of the same phase, so the speeches and the echoes can be discriminated from each other according to the difference in phase relationship, so as to achieve the purpose of separating the speeches from the echoes. The present invention uses such a difference in phase relationship to separate the speeches from the echoes.

Figure 3:
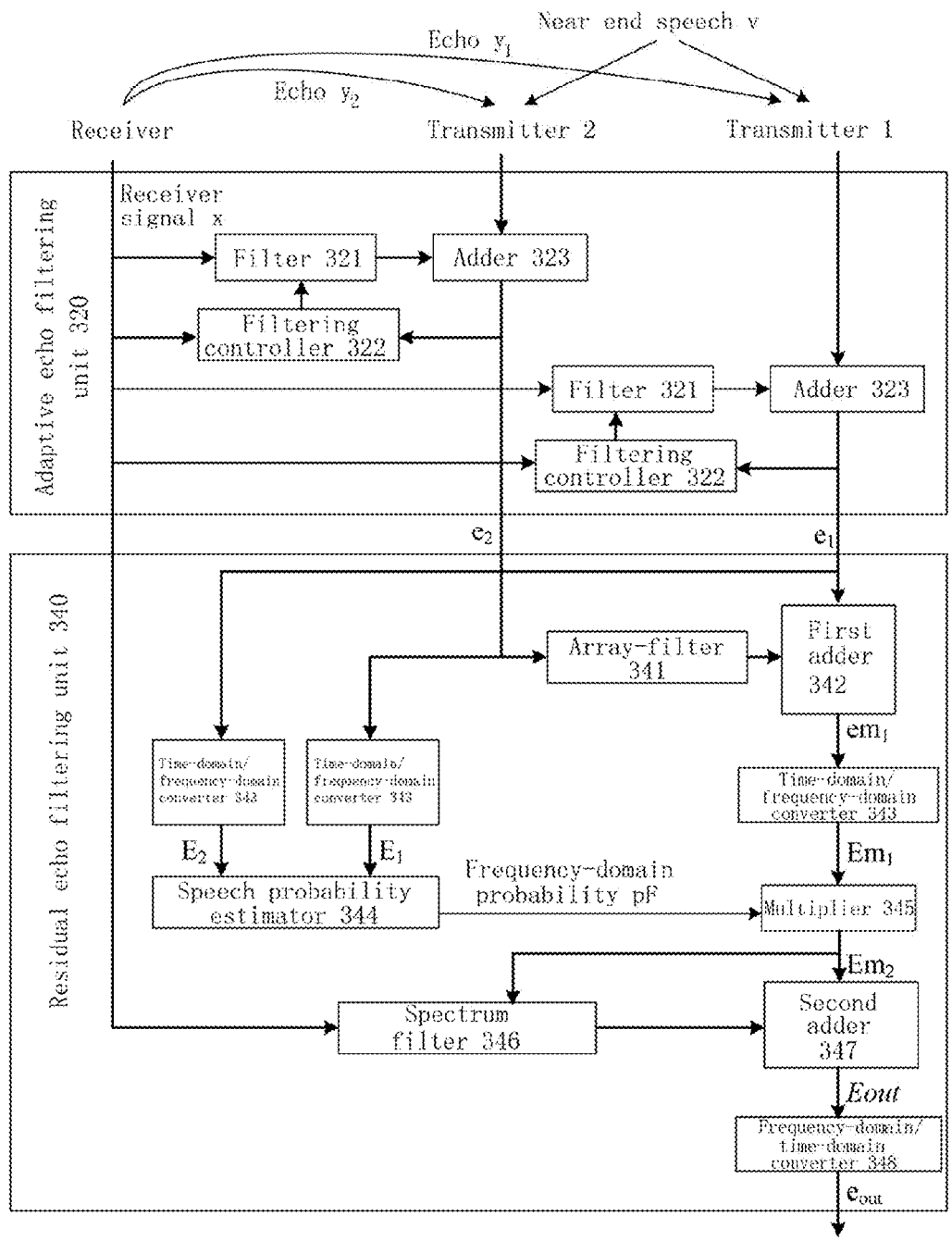
FIG. 3 is a schematic block diagram illustrating a transmitter array echo eliminating system according to an embodiment of the present invention.

FIG. 3 is a schematic block diagram illustrating a transmitter array echo eliminating system according to an embodiment of the present invention.

As shown in FIG. 3, the transmitter array echo eliminating system 300 provided by the present invention mainly consists of an adaptive echo filtering unit 320 and a residual echo filtering unit 340, which are in a cascading relationship in structure. Input signals of the adaptive echo filtering unit 320 are a receiver signal and two transmitter signals of the transmitter array. Input signals of the residual echo filtering unit 340 are the receiver signal and two output signals of the adaptive echo filtering unit 320. An output signal of the residual echo filtering unit 340 is an output signal of the transmitter array echo eliminating system (i.e., a speech signal from which the echoes have been separated).

From the viewpoint of the overall application of the transmitter array echo eliminating system 300, the transmitter array echo eliminating system proposed by the present invention is connected between the transmitters and the receiver; the receiver signal x and the transmitter signals d (including all the signals $d_1, d_2, \ldots d_M$ of the transmitter array) are input signals to system; and the transmitter signals d consist of echo signals y and a near end speech signal v. The two transmitter signals pass through the adaptive echo filtering unit 320 where echo components are mostly filtered out, with only some residual echoes entering into the residual echo filtering unit 340. After the transmitter signals pass through the residual echo filtering unit 340, the residual echoes are also filtered out. Finally, only the near end speech signal v is obtained as a speech signal from which the echoes have been separated and is outputted by the transmitter array echo eliminating system 300 to a far end of the speech communication.

Figure 4:
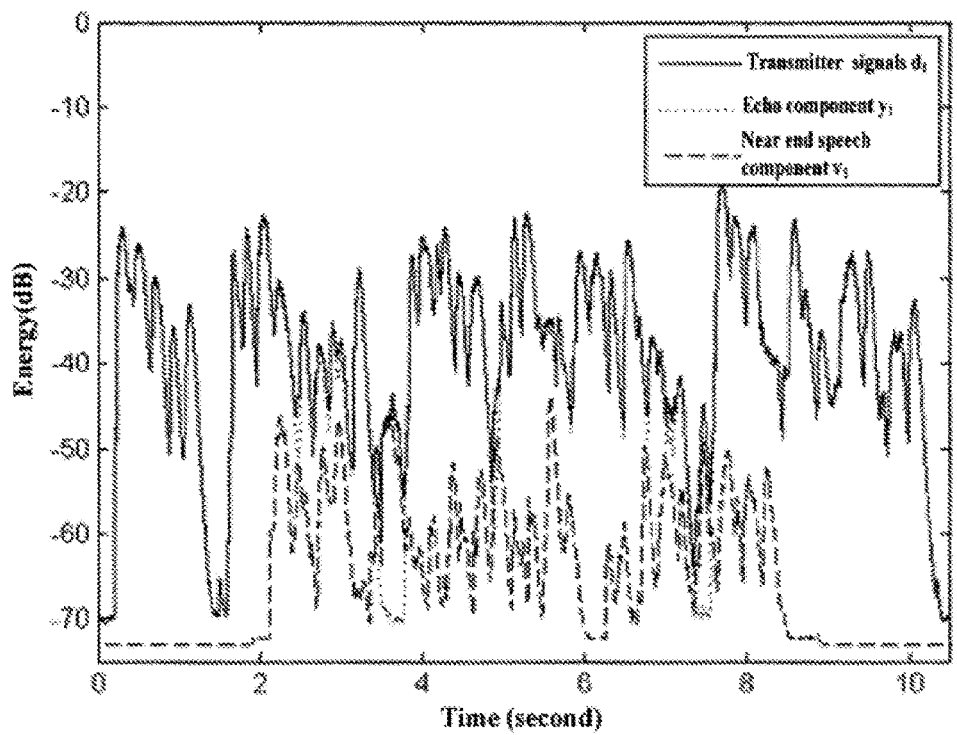
FIG. 4 is a schematic view illustrating comparison in energy between a transmitter signal and a near end speech component.

FIG. 4 is a schematic view illustrating comparison in energy between a transmitter signal and a near end speech component. As shown in FIG. 4, in a typical application, the solid line represents the transmitter signal $d_1$, the dashed line represents the near end speech component $v_1$ in the transmitter signal, and the dotted line represents the echo component $y_1$. As can be seen, in the transmitter signal, the near end speech component has a very low energy and is completely submerged in the echoes.

Hereinbelow, the constituent structure and the signal processing process of the adaptive echo filtering unit 320 and the residual echo filtering unit 340 will be illustrated, respectively.

The adaptive echo filtering unit 320 receives the receiver signal and the transmitter array signals, and filters out the echoes of (echo-filters) each of the transmitter signals in the transmitter array based on the received receiver signal so as to obtain an echo filtered signal array. In the embodiment shown in FIG. 3, the adaptive echo filtering unit 320 has three input signals (i.e., the receiver signal x and the two transmitter signals $d_1, d_2$) and its output is the echo filtered signal array that has been adaptively filtered ($e_1$ and $e_2$ in the embodiment shown in FIG. 3). In the present invention, the adaptive echo filtering unit 320 has an operation principle similar to a general-purpose adaptive echo filtering, and may adopt the time-domain filtering mode, the frequency-domain filtering mode, or the mixed time-domain and frequency-domain filtering mode.

In this embodiment, the adaptive echo filtering unit 320 comprises filters 321, filtering controllers 322, and adders 323 that are disposed corresponding to each of the transmitters in the transmitter array, respectively. The filters and the filtering controllers are adaptive filters and adaptive filtering controllers, respectively. An echo signal is adaptively matched by a comparison of similarity between the receiver signal and each of the transmitter signals, and is filtered out from the transmitter signals by means of the respective adders 323 to obtain a corresponding echo filtered signal.

The residual echo filtering unit 340 and the adaptive echo filtering unit 320 are cascaded, and the residual echoes in the echo filtering signal array outputted by the adaptive echo filtering unit 320 are filtered out based on the received receiver signal. That is, the residual echo filtering unit 340 has three input signals (i.e., the receiver signal x and the echo filtered signal array $e_1$ and $e_2$ outputted by the adaptive echo filtering unit 320), and its output is a speech signal $e_{out}$ from which all the echo components have been removed. The residual echo filtering unit 340 in this embodiment mainly comprises an array-filter 341, a first adder 342, a time-domain/frequency-domain converter 343, a speech probability estimator 344, and a multiplier 345. Additionally, the residual echo filtering unit 340 may further comprise a spectrum filter 346, a second adder 347, and a frequency-domain/time-domain converter 348.

After the residual echo filtering unit 340 receives the receiver signal and the echo filtered signal array outputted by the adaptive echo filtering unit 320, the time-domain/frequency-domain converter 343 converts each of the echo filtered signals $e_1$ and $e_2$ in the echo filtered signal array from the time domain into the frequency domain, respectively, so as to perform speech probability estimation of the frequency domain. Time-domain/frequency-domain conversion may be achieved through Fourier conversion, and may also be achieved through improved discrete numerical cosine conversion or the like.

The array-filter 341 is convoluted with the echo filtered signal $e_2$ in the echo filtered signal array so that residual echo components in the echo filtered signal $e_1$ are preliminarily eliminated according to the convolution result.

There is a positional difference between the receiver and the transmitter array, and the echoes in the transmitter 1 are approximate to the echoes in the transmitter 2 convoluted with one array-filter. Therefore, such an array-filter is convoluted with the echo filtered signal $e_2$ of the transmitter 2, and then the convolution result is subtracted from the transmitter 1. This can reduce the residual echo components in the transmitter 1 to obtain a first residual echo filtered signal $em_1$. On the basis of the echo filtered signals $e_1$ and $e_2$, some residual echoes in the first residual echo filtered signal $em_1$ are preliminarily filtered out. Hereinbelow, weights of the array-filter 341 will be analyzed and deduced as follows.

In the communication apparatus as shown in FIG. 1, positions of the transmitters and the receiver are determined. According to physical properties of sound propagation, relative relationships between the echoes and the two transmitters are also determined. If the sound at the center of the receiver is s when the receiver sounds, then signals $s_1$ and $s_2$ propagating to the two transmitters are approximately:

$$s_1(t) = \frac{\rho}{D_1} \cdot s\left(t - \frac{D_1}{c}\right)$$

$$s_2(t) = \frac{\rho}{D_2} \cdot s\left(t - \frac{D_2}{c}\right).$$

Therefore, there is an approximation relation:

$$s_1(t) = \frac{D_2}{D_1} s_2\left(t + \frac{D_2}{c} - \frac{D_1}{c}\right)$$

where $D_1$ and $D_2$ represent distances from the receiver to the transmitter 1 and the transmitter 2 respectively, t represents the current time, and c represents the acoustic speed. $\rho$ represents the energy attenuation factor, which is determined by the electro-acoustic properties of the receiver and is a constant value.

The two residual echoes have a similar relationship therebetween, and satisfy the following approximation relation:

$$e_1 = \frac{D_2}{D_1} e_2\left(t + \frac{D_2}{c} + \frac{D_1}{c}\right)$$

Therefore, the weights of the array-filter can be determined according to relative positions between the receiver and the transmitters; that is, the amplitude is $D_2/D_1$, and the time delay is $(D_1-D_2)/c$.

Figure 5:
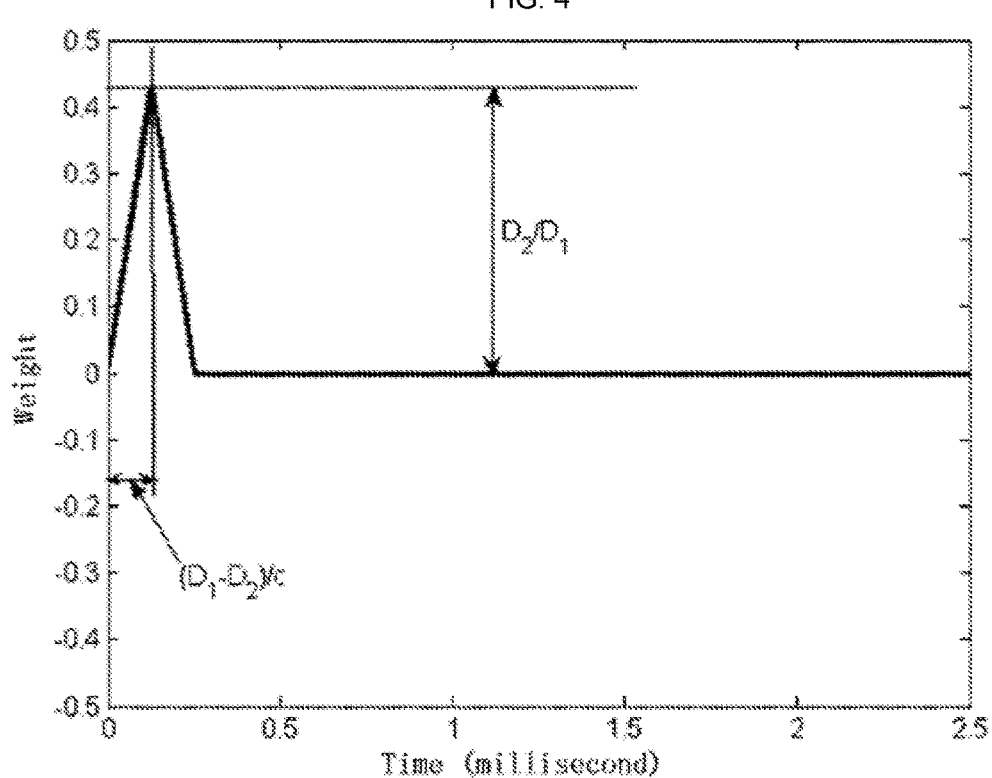
FIG. 5 is a schematic view illustrating a form of an array-filter according to an embodiment of the present invention.

FIG. 5 is a schematic view illustrating a form of the array-filter according to an embodiment of the present invention. As shown in FIG. 5, taking that the distances from the receiver to the two transmitters are $D_1$=9 cm and $D_2$=4 cm as an example, the time delay is $(D_1-D_2)/c$ and the amplitude is approximately $D_2/D_1$ when the filter is at the peak position. The weights of this array-filter can be calculated and fixed off-line in advance according to specific application requirements.

Figure 6:
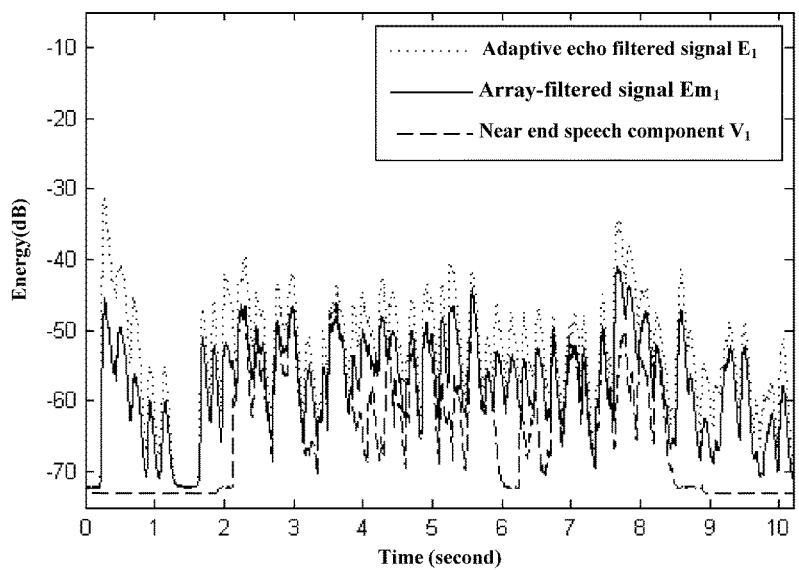
FIG. 6 is a schematic view illustrating the filtering effect of the array-filter according to the embodiment of the present invention.

FIG. 6 is a schematic view illustrating the filtering effect of the array-filter according to the embodiment of the present invention. As shown in FIG. 6, the dotted line represents an adaptive echo filtered signal $E_1$, the solid line represents an array-filtered signal $Em_1$, and the dashed line represents a near end speech component $V_1$. As can be seen in FIG. 6 from the comparison in energy between the three signals, the energy of the residual echoes is reduced in average by about 6 dB after the signals are array-filtered by the array-filter 341. As is fully illustrated in the schematic view of comparison in effect, using the array-filter 341 can filter out some echo signals to some extent.

For a transmitter array comprising more than two transmitters, the calculation fashion of the array-filters 341 is similar to that of the transmitter array comprising two transmitters. Supposing that there are M transmitters and adaptive echo filtered outputs are $E_1$, $E_2 \sim E_M$, the array-filter $h_k$ (1<k≤M) between the transmitter 1 and another transmitter k can be calculated according to relative positions between the transmitter 1 and the transmitter k. In this way, (M−1) array-filter output signals $Em_{1\_k}$ can be obtained through the (M−1) array-filters, and one of the array-filter output signals that has the least energy is selected as the final output signal $Em_1$.

Calculation of the array-filter must satisfy the least-mean-square-error criterion. Supposing that the array-filter is h, then h must satisfy:

$$\frac{\partial E[(e_1 - e_2 * h)^2]}{\partial h} = 0$$

where E[.] represents the averaging operation. Supposing that the array-filter output signal is $em_1$, then:

$em_1 = e_1 - h*e_2$, and $$em_1(n) = e_1(n) - \sum_{k=1}^{L} e_2(n-k)h(k)$$

where L represents the length of the array-filter.

Through echo filtering of the array-filter and the adder, some echo signal still remains in the obtained first residual echo filtered signal. Therefore, on the basis of the obtained first residual echo filtered signal $em_1$, the present invention further filters out the residual echoes. In the echo filtering process of this phase, the speech probability estimator and the multiplier are mainly used in combination.

Firstly, after the array-filter 341 filters out a part of echo signals in the signal $e_1$ through convolution, the time-domain/frequency-domain converter 343 is necessary to convert the signal $em_1$ from the time domain into the frequency domain (i.e., convert the signal $em_1$ into the signal $Em_1$).

By comparing time and phase relationships between the two signals $E_1$ and $E_2$ that are obtained through time-domain/frequency-domain conversion of the two echo filtered signals $e_1$ and $e_2$, the speech probability estimator 344 obtains frequency-domain speech probability information pF indicating speeches and echoes in the two echo filtered signals are distributed in which frequency regions.

The operation principle of speech probability estimation is as follows: the two transmitter signals $E_1$, $E_2$ both comprise residual echoes and speech signals, the residual echoes come from the 90° direction and have a phase difference, and the speech signals come from the 0° direction and has the same phase. Therefore, the larger the intensity of the near end speech, the more the speech components will be and the closer the phases of $E_1$ and $E_2$ will be to each other. When the near end speech is very weak, there is a little speech component and the phase difference between $E_1$ and $E_2$ is much significant. By comparing the phases of $E_1$ and $E_2$ at each frequency point, distribution in frequency of the speech signals obtained by the transmitter array can be obtained.

Specifically, an arriving angle of a sound signal in the space (i.e., a direction from which the sound signal comes) is calculated according to $E_1$ and $E_2$. If the signal comes from the 90° direction, then the signal is an echo signal and the speech probability is 0. If the signal comes from the 0° direction, then the signal is a speech signal and the speech probability is 1. If the signal comes from a direction a between 0° and 90°, then the speech probability is between 0 and 1 and is specifically $1-\alpha/90$.

Through determination of the speech probability, the speech probability at each frequency point can be obtained through calculation:

$$pF(f)=1-\alpha(f)/90;$$

where f represents the frequency.

For the transmitter array comprising more than two transmitters, the speech probability may be calculated according to the adaptive filter output signals $E_1$ and $E_M$ of the first transmitter and the $M^{th}$ transmitter, and the calculation method is the same as that of the dual-transmitter array.

By converting the array-filtered signal $em_1$ into the signal $Em_1$ through time-domain/frequency-domain conversion and then multiplying the signal $Em_1$ with the speech probability pF, an output signal $Em_2$ can be obtained.

$$Em_2(f)=Em_1(f) \cdot pF(f)$$

Figure 7:
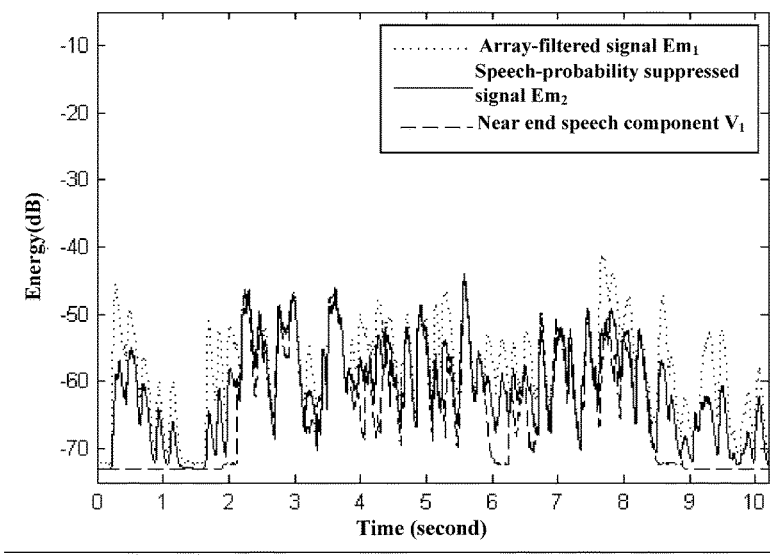
FIG. 7 is a schematic view illustrating comparison in energy of a speech-probability suppressed signal according to this embodiment.

FIG. 7 is a schematic view illustrating comparison in energy of a speech-probability suppressed signal according to this embodiment. As shown in FIG. 7, the dotted line represents the array-filtered signal $Em_1$, the solid line represents the speech-probability suppressed signal $Em_2$, and the dashed line represents the near end speech component $V_1$. As can be seen in FIG. 7 from the comparison in energy among the three signals, after array-filtering and multiplication with the speech probability, the residual echo signals are further reduced while the speech component is maintained. The speech/echo ratio of the signal $Em_2$ can be increased by more than 10 dB as compared to that of the signal $E_1$, so the residual echoes can be further suppressed to obtain purer near end speech.

Additionally, the residual echoes in the signal $Em_2$ may be further removed by means of the spectrum filter 346. From the viewpoint of energy, the residual echoes have many energy peaks, and the echoes can be further removed by suppressing the peaks.

Figure 8:
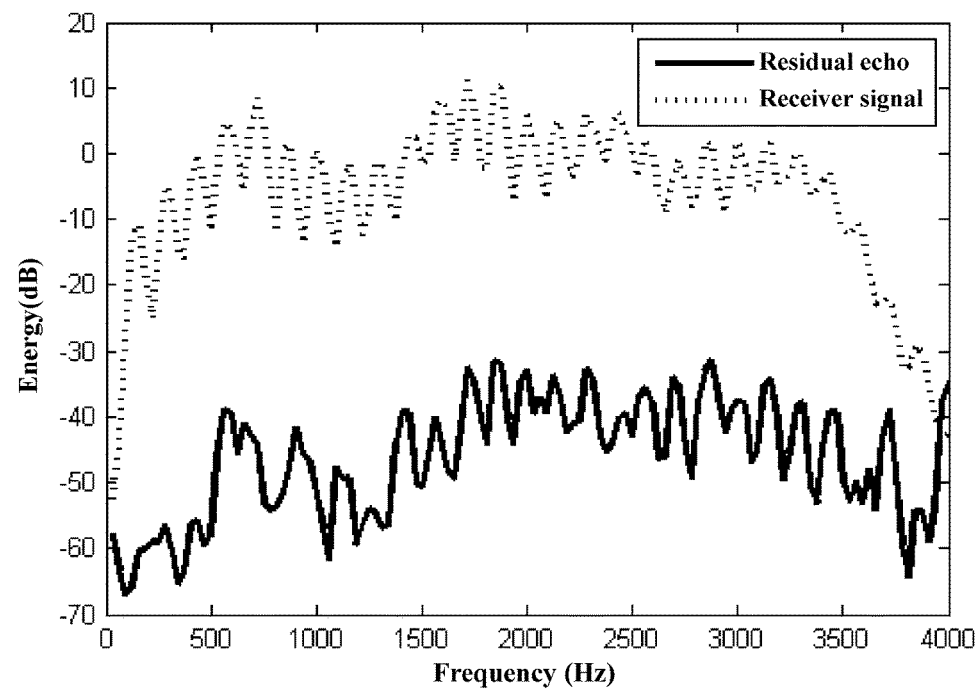
FIG. 8 is a schematic view illustrating comparison in spectrum between a receiver signal and residual echoes.

FIG. 8 is a schematic view illustrating comparison in spectrum between the receiver signal and the residual echoes. As shown in FIG. 8, the solid line represents the residual echoes, and the dotted line represents the receiver signal. Because the echoes are generated by the receiver signal, peaks of harmonic waves of the echoes and the receiver signal are at the same or close positions except that the general fluctuating forms and the signal energies are different. Therefore, spectrum envelope form matching can be performed on the receiver signal and the residual echo signal, and then the matching result is multiplied with a certain factor Ag for energy matching. Phase matching is performed on the multiplication result and the residual echo signal to obtain a matched echo. Then, the matched echo is subtracted from the residual echo signal, which can remove the residual echoes. Ag represents a factor no less than 1, and generally ranges between 1 and 8 depending on the energy of the residual echoes. In order to filter out the residual echoes completely, the larger the intensity of the residual echoes is, the larger the factor Ag shall be, the stronger the effect of spectrum filtering will be, but the larger the impair to the near end speech will be. The residual echoes become weaker after speech probability estimation, so the matched echo can be small, and less intense spectrum filtering can filter out the residual echoes. Correspondingly, the near end speech can be maintained well.

Specifically, the spectrum filtering process of the spectrum filter 346 is as follows.

Firstly, spectrum envelope form matching is performed on the receiver signal and the residual echo signal to obtain an echo estimation result. This can be achieved in the following way.

The full frequency range is divided into M subbands having boundaries $B_1 \sim B_M$, where M may be 32 or 16. The energies of $Em_2$ and X are calculated in each of the subbands, and the energies of $Em_2$ are then divided by those of X to obtain an energy matching function $H_M$. The receiver signal X is multiplied with the energy matching function $H_M$ to obtain a matched echo $Y_M$.

Figure 9:
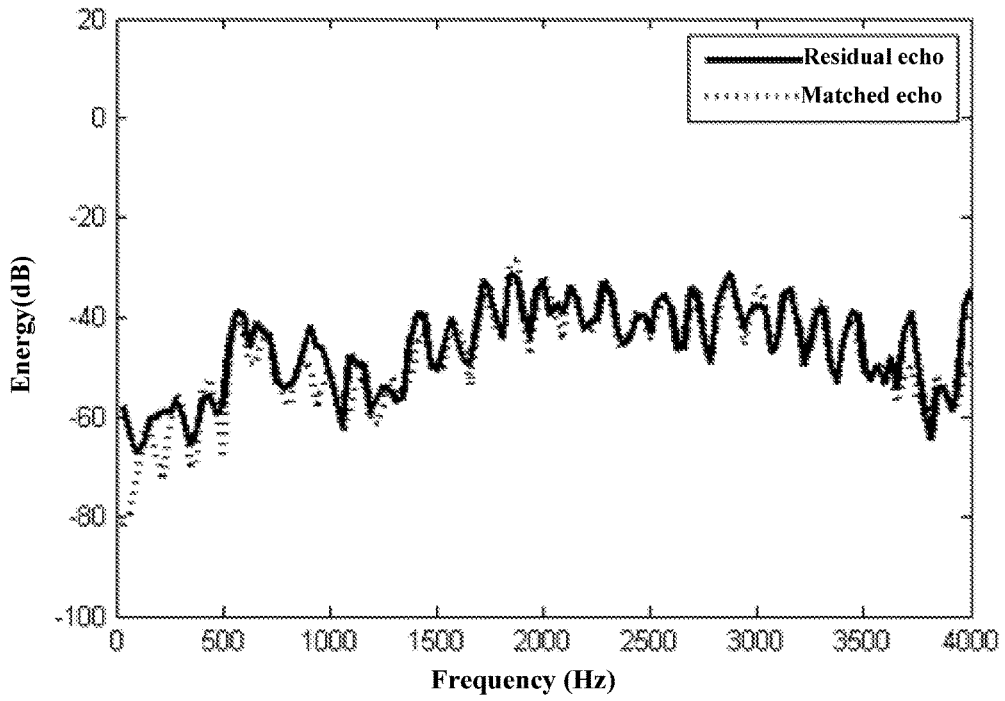
FIG. 9 is a schematic view illustrating comparison in spectrum between a matched echo and the residual echoes.

FIG. 9 is a schematic view illustrating comparison in spectrum between the matched echo and the residual echoes. As shown in FIG. 9, the solid line represents the residual echoes, the dotted line represents the matched echo, and the matching effect is quite clear.

The method for calculating the matching function is as shown by the following formula. The matching function for a frequency point f belonging to the $M^{th}$ subband is:

$$H_M(f) = \frac{\sum_{f=B_i}^{f=B_{i+1}} Em_2^2(f)}{\sum_{f=B_i}^{f=B_{i+1}} X^2(f)}, B_i \le f < B_{i+1}$$

The echo that has been subjected to spectrum envelope form matching is:

$$Y_M(f)=X(f)H_M(F)$$

The echo estimation signal obtained through energy matching and phase matching is:

$$Em_2(f) \cdot Ag \cdot \frac{|Y_M(f)|}{|Em_2(f)|}$$

Finally, the echo estimation signal is subtracted from the signal $Em_2$ by means of the adder to obtain the final speech output signal:

$$Eout(F) = Em_2(f) \cdot \left(1 - Ag \cdot \frac{|Y_M(f)|}{|Em_2(f)|}\right)$$

After the effect of the echoes on the speech is finally eliminated, a need still exists to use the frequency-domain/time-domain converter to convert the speech signal from the frequency domain back to the time domain. The frequency-domain/time-domain conversion may be achieved through inverse Fourier conversion, and may also be achieved through inverse discrete numerical cosine conversion or the like.

After the frequency-domain/time-domain conversion, a frequency-domain signal Eout is converted into a time-domain signal $e_{out}$, as an overall output signal of the transmitter array echo eliminating system 300.

Figures 10, 11:
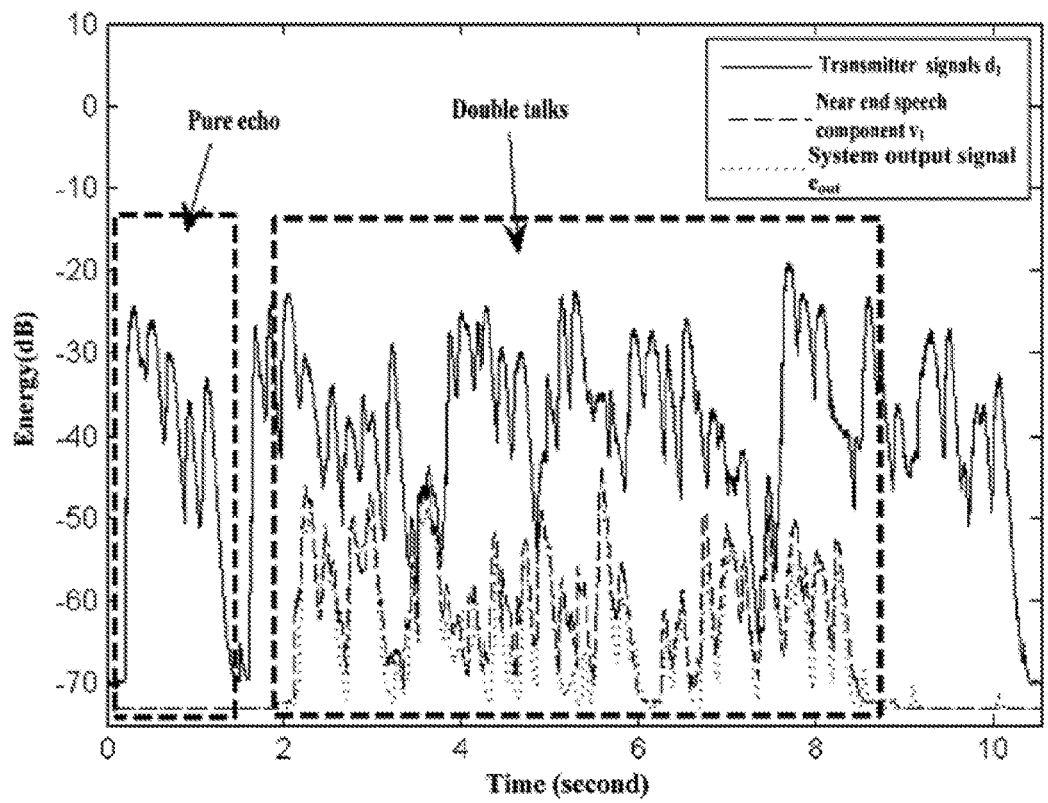
FIG. 10 is a schematic view illustrating comparison in final effect of echo filtering of the present invention.
FIG. 11 is a schematic flowchart diagram of a transmitter array echo eliminating method according to an embodiment of the present invention.

FIG. 10 is a schematic view illustrating comparison in final effect of echo filtering of the present invention. As shown in FIG. 10, the solid line represents the transmitter signal $d_1$, the dashed line represents the near end speech signal component $v_1$ in the transmitter signal, and the dotted line represents the system output signal $e_{out}$. As can be seen from the comparison in energy between the signals in FIG. 10, the output signal $e_{out}$ has particularly low energy in a region where only the echoes exist, which indicates that the echoes are suppressed completely; and the system output signal and the speech component have approximate energies in a region where the near end speech exists, which indicates that the near end speech is protected well.

FIG. 11 is a flowchart diagram of a transmitter array echo eliminating method according to an embodiment of the present invention. As shown in FIG. 11, this method starts from a step S1110. After a transmitter array receives a near end speech signal v and a receiver signal x, adaptive echo filtering is firstly performed on transmitter array signals by use of the receiver signal to obtain an echo filtered signal array. Specifically, for a transmitter array comprising two transmitters, a sound signal $d_1$ received by the transmitter 1 comprises a near end speech signal $v_1$ and an echo signal $y_1$ that is generated by the receiver (i.e., $d_1=y_1+v_1$); and a sound signal $d_2$ received by the transmitter 2 comprises a near end speech signal $v_2$ and an echo signal $y_2$ that is generated by the receiver (i.e., $d_2=y_2+v_2$). Adaptive filtering is performed on the sound signals received by the two transmitters, respectively, which is usually achieved by using an adaptive filtering unit consisting of an adaptive filter, an adaptive filter controller and an adder. The echo filtered signal array is obtained through adaptive filtering, and the echo filtered signal array in this embodiment is $e_1$ and $e_2$.

Then, in a step S1120, residual echoes in the resulting echo filtered signal array are filtered by use of the received receiver signal. Filtering of the residual echoes is achieved by using a residual echo filtering unit cascaded with the adaptive filtering unit, and the detailed filtering process is as shown in FIG. 12.

Figure 12:
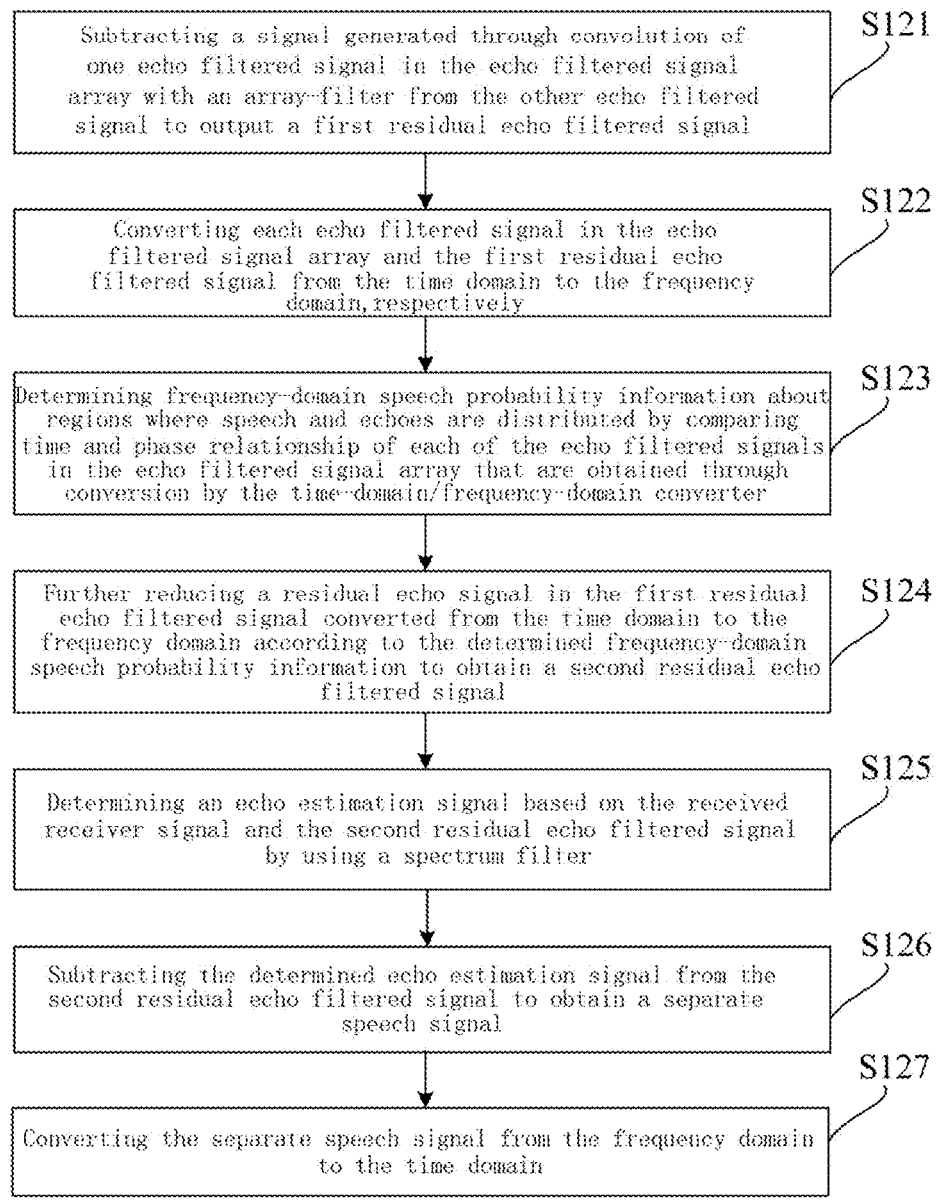
FIG. 12 is a schematic flowchart diagram of a method for filtering residual echoes according to the embodiment of the present invention.

FIG. 12 is a flowchart diagram of a method for filtering residual echoes according to the embodiment of the present invention. As shown in FIG. 12, after preliminary adaptive filtering, some echoes still remain in the signals received by the receiver. In this case, firstly, a signal generated through convolution of one echo filtered signal in the echo filtered signal array with an array-filter is subtracted from another echo filtered signal to output a first residual echo filtered signal (step S121), wherein weights of the array-filter are determined by relative positions between the receiver and the transmitter array. Then, each echo filtered signal in the echo filtered signal array and the first residual echo filtered signal are converted from the time domain to the frequency domain, respectively (step S122). There is no necessary sequence to execute the process of converting each echo filtered signal in the echo filtered signal array from the time domain to the frequency domain respectively and the filtering process in the step S121, which may be executed simultaneously or sequentially.

After each echo filtered signal in the echo filtered signal array is converted from the time domain to the frequency domain respectively, step S123 is executed to determine frequency-domain speech probability information of regions where speech and echoes are distributed, by comparing time and phase relationship of each of the echo filtered signals in the echo filtered signal array that have been subject to conversion by the time-domain/frequency-domain converter.

Then, step S124 is executed to further reduce a residual echo signal in the first residual echo filtered signal converted from the time domain to the frequency domain according to the determined frequency-domain speech probability information, to obtain a second residual echo filtered signal. Such a filtering process is achieved by multiplying the first residual echo filtered signal with the determined frequency-domain speech probability.

Then, step S125 is executed to determine an echo estimation signal based on the received receiver signal and the second residual echo filtered signal by using a spectrum filter. Specifically, spectrum envelope form matching is performed on the receiver signal and the residual echo signal, and the matching result is multiplied with a factor Ag for energy matching. Phase matching is performed on the multiplication result and the second residual echo filtered signal to obtain a matched echo. Then, the echo estimation signal is determined according to the obtained matched echo. The value of the factor Ag is a real number not less than 1, and generally ranges between 1 and 8 depending on the intensity of the residual echoes.

Step S126 is executed to subtract the determined echo estimation signal from the second residual echo filtered signal to obtain a separate speech signal.

Finally, step S127 is executed to convert the separate speech signal from the frequency domain to the time domain.

In the aforesaid embodiment, the present invention has been illustrated by taking the transmitter array comprising two transmitters as an example. In practical applications, the number of the transmitters in the transmitter array may also be a larger numerical value such as 3, 4, 5 or the like. Hereinbelow, a general-purpose device and a general-purpose method for suppressing residual echoes according to the present invention will be described.

Figure 13:
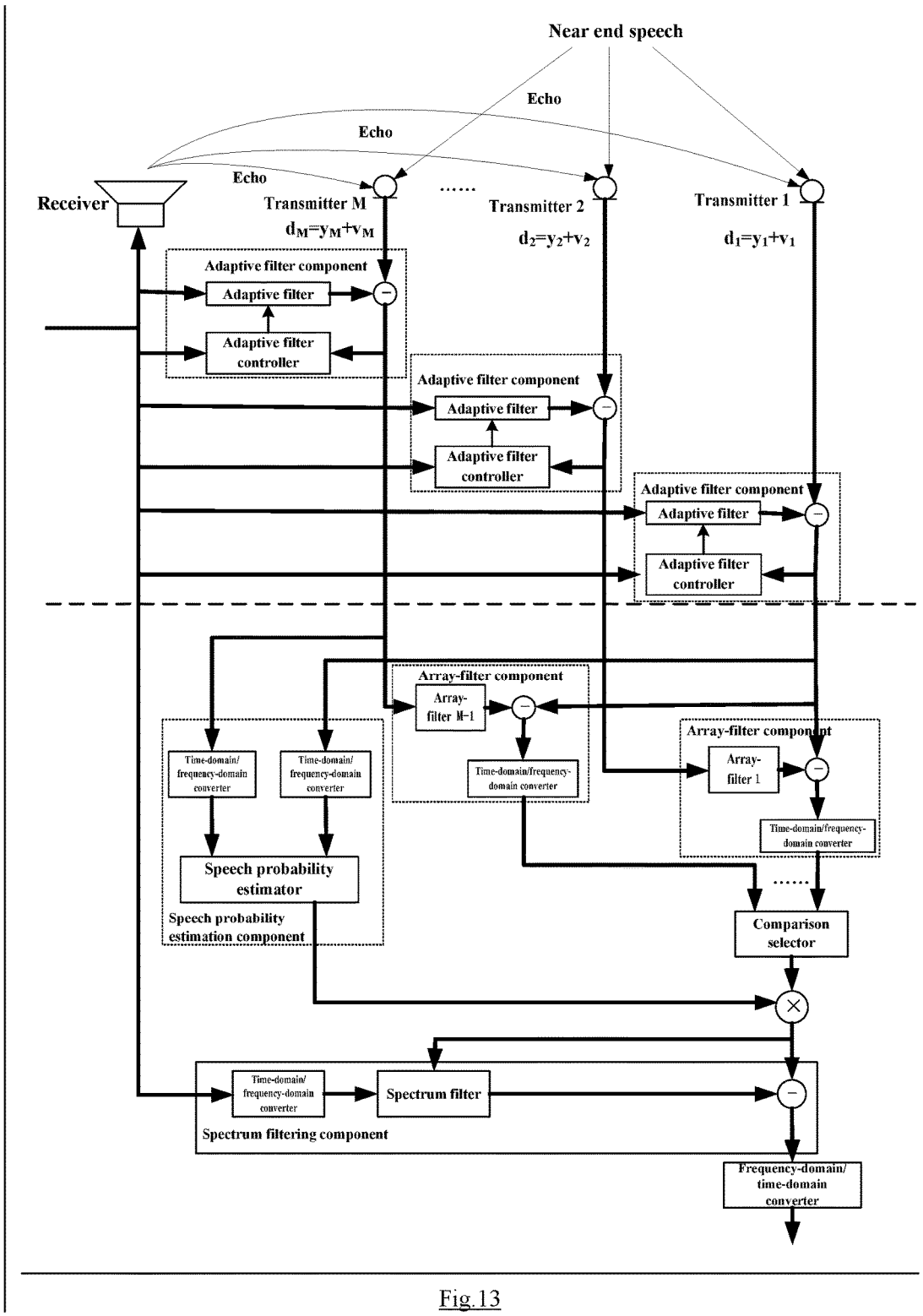
FIG. 13 is a schematic view illustrating a general-purpose structure of a device for suppressing residual echoes according to an embodiment of the present invention.

FIG. 13 is a schematic view illustrating a general-purpose structure of a device for suppressing residual echoes according to an embodiment of the present invention. The device is suitable for use in a communication apparatus comprising M transmitters and one receiver, wherein M is a natural number greater than 1, and the M transmitters are arranged in line to form an array. As shown in FIG. 13, the device comprises: M adaptive filter components, M−1 array-filter components, one comparison selector, one speech probability estimation component, one multiplier and one frequency-domain/time-domain converter.

The M adaptive filter components are configured to perform adaptive filtering on M transmitter signals respectively with a receiver signal to output M adaptive filtered signals.

The M−1 array-filter components correspond to the M−1 adaptive filtered signals except the first adaptive filtered signal in one-to-one correspondence, and each of the array-filter components comprises one array-filter, one subtractor and one time-domain/frequency-domain converter.

The array-filter is configured to array-filter the corresponding adaptive filtered signal to obtain a signal and to output the obtained signal to the subtractor. The subtractor is configured to subtract the signal outputted by the array-filter from the first adaptive filtered signal to obtain a signal and to output the obtained signal to the time-domain/frequency-domain converter. The time-domain/frequency-domain converter is configured to perform time-domain/frequency-domain conversion on the received signal to obtain a frequency-domain signal and to output the obtained signal to the comparison selector.

The comparison selector is configured to receive the M−1 frequency-domain signals outputted by the M−1 array-filter components and to select one of the frequency-domain signals that has the least energy and output the selected one signal to the multiplier.

The speech probability estimation component comprises two time-domain/frequency-domain converters and one speech probability estimator. The two time-domain/frequency-domain converters are configured to perform time-domain/frequency-domain conversion on the first adaptive filtered signal and the $M^{th}$ adaptive filtered signal respectively to obtain signals and output the obtained signals to the speech probability estimator, and the speech probability estimator is configured to perform speech probability filtering according to the two signals received so as to output one frequency-domain speech probability signal to the multiplier.

The multiplier is configured to multiply the two frequency-domain signals received to obtain a signal and output the obtained signal to the frequency-time/time-domain converter.

The frequency-domain/time-domain converter is configured to perform frequency-domain/time-domain conversion on the received signal to obtain a signal as a speech output signal in which the residual echoes have been suppressed.

In the device shown in FIG. 13, when M is equal to 2, the comparison selector is configured to receive one frequency-domain signal outputted by one array-filter component and output the frequency-domain signal to the multiplier. Alternatively, the device shown in FIG. 13 does not comprise the comparison selector, and the time-domain/frequency-domain converter in the array-filter component outputs the frequency-domain signal to the multiplier directly. In this case, the device shown in FIG. 13 is changed to the device shown in FIG. 3.

As shown in FIG. 13, the device further comprises one spectrum filtering component between the multiplier and the frequency-domain/time-domain converter.

The spectrum filtering component comprises one time-domain/frequency-domain converter, one spectrum filter and one subtractor. The time-domain/frequency-domain converter is configured to perform time-domain/frequency-domain conversion on the receiver signal to obtain a signal and output the obtained signal to the spectrum filter. The spectrum filter is configured to perform spectrum filtering on the signal outputted by the multiplier and the signal outputted by the time-domain/frequency-domain converter to obtain a signal and output the obtained signal to the subtractor. The subtractor is configured to subtract the signal outputted by the spectrum filter from the signal outputted by the multiplier to obtain a signal and output the obtained signal to the frequency-domain/time-domain converter.

In the device shown in FIG. 13, weights of each of the array-filters are determined according to the following formulas:

$$\frac{\partial E[(e_1 - e_2 * h)^2]}{\partial h} = 0,$$

-continued $$e_1 = \frac{D_2}{D_1} e_2 \left( t + \frac{D_2}{c} + \frac{D_1}{c} \right)$$

where h represents the array-filter, $e_1$ represents the first adaptive filtered signal, $e_2$ represents the adaptive filtered signal corresponding to the array-filter, $D_1$ represents a distance between the receiver and the first transmitter, $D_2$ represents a distance between the receiver and the one of the transmitters that corresponds to the array-filter, and c represents the acoustic speed.

In the device shown in FIG. 13, the speech probability estimator is configured to calculate an arriving angle α(f) of a sound signal arriving at the transmitter array at each frequency point according to the two signals received, then calculate the speech probability pF(f) according to the following formula: pF(f)=1−α(f)/90, and output pF(f) to the multiplier as the frequency-domain speech probability signal.

In the device shown in FIG. 13, the spectrum filter is configured to divide the full frequency range into N subbands having boundaries $B_1 \sim B_{N+1}$, and perform the following calculations in each of the N subbands:

calculating a matching function $H_M(f)$:

$$H_M(f) = \frac{\sum_{f=B_i}^{f=B_{i+1}} Em_2^2(f)}{\sum_{f=B_i}^{f=B_{i+1}} X^2(f)}$$

where i is a serial number of each of the subbands, $Em_2(f)$ is an output signal of the multiplier, and X(f) is an output signal of the time-domain/frequency-domain converter;

calculating a matched echo $Y_M(f)$: $Y_M(f)=X(f)H_M(F)$; and multiplying the matched echo $Y_M(f)$ with a factor Ag to obtain a spectrum filtering result and output the obtained result to the subtractor.

Figure 14:
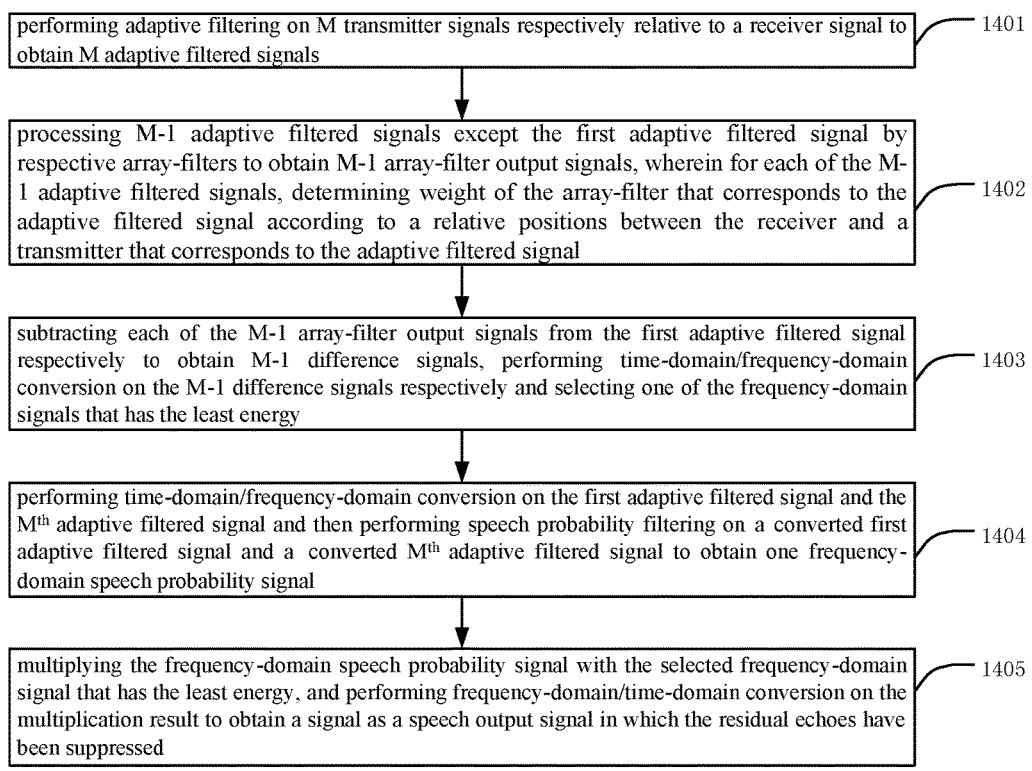
FIG. 14 is a general-purpose flowchart diagram of a method for suppressing residual echoes according to an embodiment of the present invention.

FIG. 14 is a general-purpose flowchart diagram of a method for suppressing residual echoes according to an embodiment of the present invention. The method is suitable for use in a communication apparatus comprising M transmitters and one receiver, wherein M is a natural number greater than 1, and the M transmitters are arranged in line to form an array. As shown in FIG. 14, the method comprises:

1401: performing adaptive filtering on M transmitter signals respectively with a receiver signal to obtain M adaptive filtered signals;

1402: processing M−1 adaptive filtered signals except the first adaptive filtered signal by respective array-filters to obtain M−1 array-filter output signals, wherein for each of the adaptive filtered signals, weights of the array-filters that corresponds to the adaptive filtered signal is determined according to relative positions between the receiver and the transmitters that corresponds to the adaptive filtered signal;

1403: subtracting each of the M−1 array-filter output signals from the first adaptive filtered signal respectively to obtain M−1 difference signals, performing time-domain/frequency-domain conversion on the M−1 difference signals respectively and selecting one of the frequency-domain signals that has the least energy;

1404: performing time-domain/frequency-domain conversion on the first adaptive filtered signal and the $M^{th}$ adaptive filtered signal and then performing speech probability filtering on a converted first adaptive filtered signal and a converted $M^{th}$ adaptive filtered signal to obtain one frequency-domain speech probability signal; and

1405: multiplying the frequency-domain speech probability signal with the selected frequency-domain signal that has the least energy, and performing frequency-domain/time-domain conversion on the multiplication result to obtain a signal as a speech output signal in which the residual echoes have been suppressed.

In the method shown in FIG. 14, when M is equal to 2:

the step of processing the M−1 adaptive filtered signals except the first adaptive filtered signal by respective array-filters to obtain M−1 array-filter output signals is: processing the other adaptive filtered signal except the first adaptive filtered signal by an array-filter to obtain one array-filter output signal;

the step of subtracting each of the M−1 array-filter output signals from the first adaptive filtered signal respectively to obtain M−1 difference signals, performing time-domain/frequency-domain conversion on the M−1 difference signals respectively and selecting one of the frequency-domain signals that has the least energy is: subtracting the other array-filter output signal from the first adaptive filtered signal to obtain one difference signal, and performing time-domain/frequency-domain conversion on the difference signal; and the step of multiplying the frequency-domain speech probability signal with the selected frequency-domain signal that has the least energy is: multiplying the frequency-domain speech probability signal with a signal obtained through time-domain/frequency-domain conversion on the difference signal.

In the method shown in FIG. 14, the method further comprises the following step after the step of multiplying the frequency-domain speech probability signal with the one selected frequency-domain signal that has the least energy:

performing spectrum filtering on the multiplication result and the receiver signal that has been subject to time-domain/frequency-domain conversion, subtracting the spectrum filtering result from the multiplication result, and performing frequency-domain/time-domain conversion on the subtraction result to obtain a signal as the speech output signal in which the residual echoes have been suppressed.

In the method shown in FIG. 14, the step of, for each of the adaptive filtered signals, determining weights of the one of the array-filters that corresponds to the adaptive filtered signal according to relative positions between the receiver and the one of the transmitters that corresponds to the adaptive filtering signal comprises:

for each of current adaptive filtered signals among the M−1 adaptive filtered signals except the first adaptive filtered signal, weights of the respective array-filter are determined according to the following formulas:

$$\frac{\partial E[(e_1 - e_2 * h)^2]}{\partial h} = 0,$$

$$e_1 = \frac{D_2}{D_1} e_2 \left( t + \frac{D_2}{c} + \frac{D_1}{c} \right)$$

where h represents the array-filter, $e_1$ represents the first adaptive filtered signal, $e_2$ represents the current adaptive filtered signal, $D_1$ represents a distance between the receiver and the first transmitter, $D_2$ represents a distance between the receiver and the one of the transmitters that corresponds to the current adaptive filtered signal, and c represents the acoustic speed.

In the method shown in FIG. 14, the step of performing time-domain/frequency-domain conversion on the first adaptive filtered signal and the $M^{th}$ adaptive filtered signal and then performing speech probability filtering on the converted first adaptive filtered signal and the converted $M^{th}$ adaptive filtered signal to obtain one frequency-domain speech probability signal comprises:

calculating an arriving angle $\alpha(f)$ of a sound signal arriving at the transmitter array at each frequency point according to the two results of performing time-domain/frequency-domain conversion on the first adaptive filtered signal and the $M^{th}$ adaptive filtered signal; and then calculating the speech probability pF(f) according to the following formula:

$$pF(f)=1-\alpha(f)/90;$$

where pF(f) is the frequency-domain speech probability signal obtained.

In the method shown in FIG. 14, the step of performing spectrum filtering on the multiplication result and the receiver signal that has been subject to time-domain/frequency-domain conversion comprises:

dividing the full frequency range into N subbands having boundaries $B_1 \sim B_{N+1}$, and performing the following calculations in each of the N subbands:

calculating a matching function $H_M(f)$:

$$H_M(f) = \frac{\sum_{f=B_i}^{f=B_{i+1}} Em_2^2(f)}{\sum_{f=B_i}^{f=B_{i+1}} X^2(f)}$$

where i is a serial number of each of the subbands, $Em_2(f)$ is the multiplication result, and X(f) is a result obtained from the time-domain/frequency-domain conversion on the receiver signal;

calculating a matched echo $Y_M(f)$: $Y_M(f)=X(f)H_M(F)$;

multiplying the matched echo $Y_M(f)$ with a factor Ag to obtain a spectrum filtering result; and then subtracting the spectrum filtering result from the multiplication result is represented as:

$$Em_2(f) \cdot \left(1 - Ag \frac{|Y_M(f)|}{|Em_2(f)|}\right).$$

In the above description, the transmitter array residual echo eliminating method and system for eliminating echoes according to the present invention have been illustrated as an example with reference to the attached drawings. Obviously, without departing from the concept of the present invention, those of ordinary skilled in the art can make many applications and alterations on the device and the technologies disclosed herein without the need of making inventive efforts, and those applications and alterations may be different from the device and the technologies disclosed herein. Therefore, the present invention shall be understood as including each novel feature and novel combination of features proposed or comprised in the device and the technologies disclosed herein, and any equivalent modifications and changes made by those of ordinary skilled in the art according to the contents disclosed in the present invention shall all fall within the scope of the claims.

The invention claimed is:

1. A method for suppressing residual echoes, the method being suitable for use in a communication apparatus comprising M transmitters and one receiver, wherein M is a natural number greater than 1, and the M transmitters are arranged in line to form an array, the method comprising:

performing adaptive filtering on M transmitter signals respectively relative to a receiver signal to obtain M adaptive filtered signals;

processing M−1 adaptive filtered signals except the first adaptive filtered signal by respective array-filters to obtain M−1 array-filter output signals, wherein for each of the M−1 adaptive filtered signals, weight of the array-filter that corresponds to the adaptive filtered signal is determined according to a relative positions between the receiver and first transmitter and a relative position between the receiver and one of transmitters that corresponds to current adaptive filtered signal;

subtracting each of the M−1 array-filter output signals from the first adaptive filtered signal respectively to obtain M−1 difference signals, performing time-domain/frequency-domain conversion on the M−1 difference signals respectively and selecting a frequency-domain signal that has the least energy;

performing time-domain/frequency-domain conversion on the first adaptive filtered signal and the $M^{th}$ adaptive filtered signal and then performing speech probability filtering on a converted first adaptive filtered signal and a converted $M^{th}$ adaptive filtered signal to obtain one frequency-domain speech probability signal; and multiplying the frequency-domain speech probability signal with the selected frequency-domain signal that has the least energy, and performing frequency-domain/time-domain conversion on the multiplication result to obtain a signal as a speech output signal in which the residual echoes have been suppressed;

wherein the step of, for each of the M−1 adaptive filtered signals, weight of the array-filter that corresponds to the adaptive filtered signal is determined according to a relative positions between the receiver and first transmitter and a relative position between the receiver and one of the transmitters that corresponds to current adaptive filtered signal comprises:

for each of current adaptive filtered signals among the M−1 adaptive filtered signals except the first adaptive filtered signal, weights of the respective array-filter are determined according to the following formulas:

$$\frac{\partial E[(e_1 - e_2 * h)^2]}{\partial h} = 0,$$

$$e_1 = \frac{D_2}{D_1} e_2 \left( t + \frac{D_2}{c} + \frac{D_1}{c} \right)$$

where E[.] represents an averaging operation, h represents the array-filter, $e_1$ represents the first adaptive filtered signal, $e_2$ represents a current adaptive filtered signal, $D_1$ represents a distance between the receiver and the first transmitter, $D_2$ represents a distance between the receiver and one of the transmitters that corresponds to the current adaptive filtered signal, and c represents the acoustic speed, t represents a current time;

wherein the step of performing time-domain/frequency-domain conversion on the first adaptive filtered signal and the $M^{th}$ adaptive filtered signal and then performing speech probability filtering on a converted first adaptive filtered signal and a converted $M^{th}$ adaptive filtered signal to obtain one frequency-domain speech probability signal comprises:

calculating an arriving angle α(f) of a sound signal arriving at the transmitter array at each frequency point according to the two results of performing time-domain/frequency-domain conversion on the first adaptive filtered signal and the $M^{th}$ adaptive filtered signal; and then calculating the speech probability pF(f) according to the following formula:

pF(f)=1−α(f)/90;

where pF(f) is the frequency-domain speech probability signal obtained, f represents the frequency.

2. The method of claim 1, further comprising a following step after the step of multiplying the frequency-domain speech probability signal with the selected frequency-domain signal that has the least energy:

performing spectrum filtering on the multiplication result and a receiver signal that has been subject to time-domain/frequency-domain conversion to obtain a spectrum filtering result, subtracting the spectrum filtering result from the multiplication result to obtain a subtraction result, and performing frequency-domain/time-domain conversion on the subtraction result to obtain a signal as the speech output signal in which the residual echoes have been suppressed.

3. The method of claim 2, wherein the step of performing spectrum filtering on the multiplication result and a receiver signal that has been subject to time-domain/frequency-domain conversion to obtain a spectrum filtering result comprises:

dividing the full frequency range into N subbands with boundaries $B_1$~$B_{N+1}$, and performing the following calculations in each of the N subbands:

calculating a matching function HM(f):

$$H_M(f) = \frac{\sum_{f=B_i}^{f=B_{i+1}} Em_2^2(f)}{\sum_{f=B_i}^{f=B_{i+1}} X^2(f)}$$

where i is a serial number of each of the subbands, $Em_2(f)$ is the multiplication result, and X(f) is a result obtained from the time-domain/frequency-domain conversion on the receiver signal;

calculating a matched echo $Y_M(f)$: $Y_M(f)=X(f)H_M(f)$;

multiplying the matched echo YM(f) with a factor Ag to obtain a spectrum filtering result;

and then subtracting the spectrum filtering result from the multiplication result is processed as:

$$Em_2(f) \cdot \left(1 - Ag \frac{|Y_M(f)|}{|Em_2(f)|}\right).$$

4. A device for suppressing residual echoes, the device being suitable for use in a communication apparatus comprising M transmitters and one receiver, wherein M is a natural number greater than 1, and the M transmitters are arranged in line to form an array, and the device comprises: M adaptive filter components, M−1 array-filter components, one comparison selector, one speech probability estimation component, one multiplier and one time-domain/frequency-domain converter, wherein, the M adaptive filter components are configured to perform adaptive filtering on M transmitter signals respectively relative to a receiver signal to output M adaptive filtered signals;

the M−1 array-filter components correspond to M−1 adaptive filtered signals except the first adaptive filtered signal in one-to-one correspondence, wherein for each of the M−1 adaptive filtered signals, weight of the array-filter that corresponds to the adaptive filtered signal is determined according to a relative position between the receiver and first transmitter and a relative position between the receiver and one of transmitters that corresponds to current adaptive filtered signal, and each of the array-filter components comprises one array-filter, one subtractor and one time-domain/frequency-domain converter, wherein the array-filter is configured to perform array-filtering on the corresponding adaptive filtered signal to obtain a signal and output the obtained signal to the subtractor, the subtractor is configured to subtract the signal outputted by the array-filter from the first adaptive filtered signal to obtain a signal and output the obtained signal to the time-domain/frequency-domain converter, and the time-domain/frequency-domain converter is configured to perform time-domain/frequency-domain conversion on a received signal to obtain a frequency-domain signal and output the obtained frequency-domain signal to the comparison selector;

the comparison selector is configured to receive M−1 frequency-domain signals outputted by the M−1 array-filter components and select a frequency-domain signal that has the least energy and output the one selected signal to the multiplier;

the speech probability estimation component comprises two time-domain/frequency-domain converters and one speech probability estimator, wherein the two time-domain/frequency-domain converters are configured to perform time-domain/frequency-domain conversion on the first adaptive filtered signal and the $M^{th}$ adaptive filtered signal respectively to obtain two signals and output the obtained two signals to the speech probability estimator, and the speech probability estimator is configured to perform speech probability filtering according to the two signals received so as to output one frequency-domain speech probability signal to the multiplier;

the multiplier is configured to multiply the frequency-domain speech probability signal with the selected frequency-domain signal that has the least energy received to obtain a signal and output the obtained signal to the frequency-time/time-domain converter; and the frequency-domain/time-domain converter is configured to perform frequency-domain/time-domain conversion on the received signal to obtain a signal as a speech output signal in which the residual echoes have been suppressed;

wherein weights of each of the array-filters are determined according to the following formulas:

$$\frac{\partial E[(e_1 - e_2 * h)^2]}{\partial h} = 0,$$

$$e_1 = \frac{D_2}{D_1} e_2 \left( t + \frac{D_2}{c} + \frac{D_1}{c} \right)$$

where E[.] represents an averaging operation, h represents the array-filter, $e_1$ represents the first adaptive filtered signal, $e_2$ represents the adaptive filtered signal corresponding to the array-filter, $D_1$ represents a distance between the receiver and the first transmitter, $D_2$ represents a distance between the receiver and one of transmitters that corresponds to the array-filter, and c represents the acoustic speed, t represents a current time;

wherein the speech probability estimator is configured to calculate an arriving angle α(f) of a sound signal arriving at the transmitter array at each frequency point according to two signals received, then calculate the speech probability pF(f) according to the following formula: pF(f)=1−α(f)/90, and output pF(f) to the subtractor as the frequency-domain speech probability signal, where f represents the frequency.

5. The device of claim 4, further comprising one spectrum filtering component between the multiplier and the frequency-domain/time-domain converter, the spectrum filtering component comprises one time-domain/frequency-domain converter, one spectrum filter and one subtractor, wherein the time-domain/frequency-domain converter is configured to perform time-domain/frequency-domain conversion on a receiver signal to obtain a signal and output the obtained signal to the spectrum filter, the spectrum filter is configured to perform spectrum filtering on the signal outputted by the multiplier and the signal outputted by the time-domain/frequency-domain converter to obtain a signal and output the obtained signal to the subtractor, and the subtractor is configured to subtract the signal outputted by the spectrum filter from the signal outputted by the multiplier to obtain a signal and output the obtained signal to the frequency-domain/time-domain converter.

6. The device of claim 5, wherein the spectrum filter is configured to divide the full frequency range into N subbands having boundaries $B_1 \sim B_{N+1}$, and perform the following calculations in each of the N subbands:

calculating a matching function $H_M(f)$:

$$H_M(f) = \frac{\sum_{f=B_i}^{f=B_{i+1}} Em_2^2(f)}{\sum_{f=B_i}^{f=B_{i+1}} X^2(f)}$$

where i is a serial number of each of the subbands, $Em_2(f)$ is an output signal of the multiplier, and X(f) is an output signal of the time-domain/frequency-domain converter;

calculating a matched echo $Y_M(f)$: $Y_M(f)=X(f)H_M(f)$; and multiplying the matched echo $Y_M(f)$ with a factor Ag to obtain a spectrum filtering result and output the obtained spectrum filtering result to the subtractor.

* * * * *

UNITED STATES PATENT AND TRADEMARK OFFICE
CERTIFICATE OF CORRECTION

PATENT NO. : 9,685,172 B2  
APPLICATION NO. : 13/642661  
DATED : June 20, 2017  
INVENTOR(S) : Shasha Lou et al.

Page 1 of 1

It is certified that error appears in the above-identified patent and that said Letters Patent is hereby corrected as shown below:

On the Title Page

Item (30) Foreign Application Priority Data:  
Add --July 8, 2011 (CN) ...............................2011 1 0191669.X--

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*